US012706319B2

(12) United States Patent
Iwasaki et al.

(10) Patent No.: US 12,706,319 B2
(45) Date of Patent: Aug. 11, 2026

(54) HYDROGEN SUPPLY DEVICE

(71) Applicant: TOYOTA JIDOSHA KABUSHIKI KAISHA, Toyota (JP)

(72) Inventors: Ryota Iwasaki, Okazaki (JP); Yoshifumi Kawakami, Toyota (JP); Tomoyuki Matsuo, Toyota (JP); Tomohiro Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 18/438,844

(22) Filed: Feb. 12, 2024

(65) Prior Publication Data

US 2024/0363878 A1 Oct. 31, 2024

(30) Foreign Application Priority Data

Apr. 27, 2023 (JP) ................................ 2023-073234

(51) Int. Cl.

| | |
|---|---|
| ***H01M 8/04*** | (2016.01) |
| ***H01M 8/04029*** | (2016.01) |
| ***H01M 8/04082*** | (2016.01) |
| ***H01M 8/0432*** | (2016.01) |
| ***H01M 8/04746*** | (2016.01) |

(52) U.S. Cl.

CPC ... *H01M 8/04776* (2013.01); *H01M 8/04029* (2013.01); *H01M 8/04201* (2013.01); *H01M 8/04373* (2013.01)

(58) Field of Classification Search

CPC ......... H01M 8/04776; H01M 8/04029; H01M 8/04201; H01M 8/04373; H01M 8/04208; F02M 21/0206; F02M 21/06

See application file for complete search history.

(56) References Cited

U.S. PATENT DOCUMENTS

2006/0201164 A1 9/2006 Groetzbach et al.
2009/0241861 A1* 10/2009 Sano .................. F02M 21/0206 123/3
2022/0341546 A1* 10/2022 Jung ......................... F17C 7/02
2023/0016974 A1* 1/2023 Takaki ............. H01M 8/04029

FOREIGN PATENT DOCUMENTS

JP H06-336934 A 12/1994
JP 2005086914 A * 3/2005 ........ H01M 8/04208
JP 2007-518940 A 7/2007
JP 2022-145095 A 10/2022

* cited by examiner

*Primary Examiner* — Grant Moubry
(74) *Attorney, Agent, or Firm* — SoraIP, Inc.

(57) ABSTRACT

It includes a heater, a vaporizer, a circulation flow path for circulating a heat medium between the heater and the vaporizer, a circulation pump, and a control unit, and the control unit is supplied with hydrogen gas flowing out from the vaporizer. The output of the power unit to be output and the temperature of the heat medium flowing out from the vaporizer are input, and the drive duty command value of the circulation pump is calculated based on the temperature of the heat medium flowing out from the vaporizer and the output of the hydrogen engine, and the circulation pump is driven based on the calculated drive duty command value.

3 Claims, 4 Drawing Sheets

ENGINE CONTROL UNIT
CPU
MEMORY
START
CONTROL UNIT
CPU
MEMORY
HYDROGEN ENGINE
HEATER
TL
VAPORIZER

75
BASE DRIVE DUTY D
D2
D1
TL1
TL2
VAPORIZER OUTLET HEAT MEDIUM
TEMPERATURE TL

HYDROGEN SUPPLY DEVICE

CROSS-REFERENCE TO RELATED APPLICATION

This application claims priority to Japanese Patent Application No. 2023-073234 filed on Apr. 27, 2023, incorporated herein by reference in its entirety.

BACKGROUND

1. Technical Field

The present disclosure relates to temperature control of a hydrogen gas in a hydrogen supply device that vaporizes liquid hydrogen and supplies a hydrogen gas.

2. Description of Related Art

Japanese Unexamined Patent Application Publication No. 2022-145095 (JP 2022-145095 A) discloses a technology to maintain a rotating electric machine within a predetermined temperature range by changing the flow rate of a coolant flowing into a heat exchanger that cools a coolant of the rotating electric machine according to the rotational speed of the rotating electric machine.

SUMMARY

In recent years, hydrogen engine vehicles provided with a hydrogen engine that directly burns a hydrogen gas instead of gasoline have been used. In these hydrogen engine vehicles, a hydrogen gas obtained by vaporizing liquid hydrogen is supplied to the hydrogen engine. If the temperature of the hydrogen gas supplied to the hydrogen engine is too high, the output of the hydrogen engine may be reduced. If the temperature of the hydrogen gas is too low, hydrogen piping may be damaged by the hydrogen gas at an extremely low temperature. Therefore, it is required that the hydrogen gas supplied to the hydrogen engine should be within a predetermined temperature range.

Therefore, the hydrogen supply device according to the present disclosure has an object to maintain the temperature of a hydrogen gas supplied to a power device within a predetermined temperature range.

An aspect of the present disclosure provides a hydrogen supply device including:

a heater that heats a heating medium;

a vaporizer that vaporizes liquid hydrogen into a hydrogen gas using the heated heating medium;

a circulation flow path that circulates the heating medium between the heater and the vaporizer;

a circulation pump provided in the circulation flow path to pump the heating medium; and a control unit that adjusts operation of the circulation pump, in which the control unit is configured to:

receive an output of a power device to which the hydrogen gas flowing out of the vaporizer is supplied and a temperature of the heating medium flowing out of the vaporizer;

calculate a drive duty command value for the circulation pump based on the temperature of the heating medium flowing out of the vaporizer and the output of the power device; and drive the circulation pump based on the calculated drive duty command value.

Consequently, it is possible to maintain the temperature of a hydrogen gas supplied to a power device within a predetermined temperature range, even when the output of the power device changes.

In the hydrogen supply device according to the present disclosure, the control unit may be further configured to:

calculate a base drive duty for the circulation pump based on the temperature of the heating medium flowing out of the vaporizer;

calculate a correction coefficient based on the output of the power device; and calculate the drive duty command value by multiplying the base drive duty by the correction coefficient.

Consequently, it is possible to calculate the drive duty command value according to the output of the power device.

In the hydrogen supply device according to the present disclosure, the control unit may be further configured to:

calculate the base drive duty such that the base drive duty becomes smaller as the temperature of the heating medium flowing out of the vaporizer becomes higher; and calculate the correction coefficient such that the correction coefficient becomes larger as the output of the power device becomes larger.

Consequently, the flow rate of the circulation pump is increased and reduced in advance of changes in the temperature of the hydrogen gas flowing out of the vaporizer, and thus it is possible to maintain the temperature of the hydrogen gas supplied to the power device within the predetermined temperature range, even when the output of the power device is changed.

The hydrogen supply device according to the present disclosure can maintain the temperature of the hydrogen gas supplied to the power device within the predetermined temperature range.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a hydrogen supply device 100 according to an embodiment will be described with reference to the drawings. In the following description, hydrogen supply device 100 will be described as one that supplies hydrogen gas to hydrogen engine 15, which is a power device mounted on hydrogen engine vehicle 200.

Figure 1:
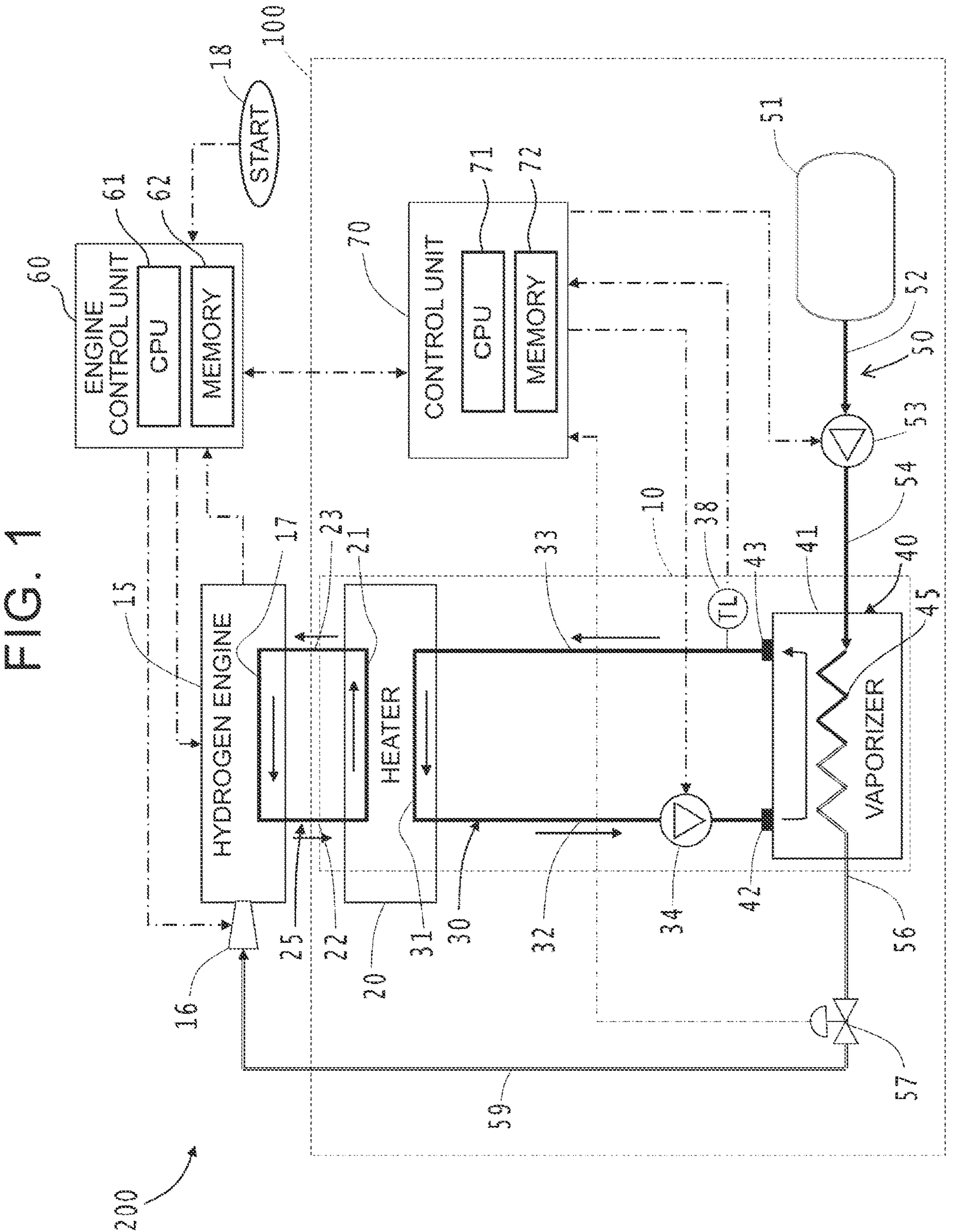
FIG. 1 is a system diagram showing the configuration of a hydrogen supply device according to an embodiment and a hydrogen engine vehicle equipped with the hydrogen supply device.

As shown in FIG. 1, the hydrogen supply device 100 includes a heating circuit 10 that heats a heat medium and supplies it to the vaporizer 40, a hydrogen circuit 50 that supplies the hydrogen gas vaporized in the vaporizer 40 to the hydrogen engine 15, A control unit 70 is provided. First, the heating circuit 10 will be explained. The heating circuit 10 includes a heater 20, a vaporizer 40, a circulation flow path 30, and a circulation pump 34.

The heater 20 includes a coolant flow path 21 and a heat medium flow path 31 inside. The high-temperature coolant that has passed through the internal flow path 17 of the hydrogen engine 15 flows through the coolant flow path 21. The low-temperature heat medium that has passed through the inside of the casing 41 of the vaporizer 40 flows through the heat medium flow path 31. The heater 20 heats the heat medium by exchanging heat between the high temperature coolant flowing through the coolant flow path 21 and the low temperature heat medium. Here, the heat medium is a liquid, and may be a long life coolant (LLC), for example.

The coolant flow path 21 is connected to the internal flow path 17 by a coolant supply pipe 22 and a coolant return pipe 23. The internal flow path 17, the coolant flow path 21, the coolant supply pipe 22, and the coolant return pipe 23 form a coolant circulation flow path 25 that circulates coolant between the hydrogen engine 15 and the heater 20. The coolant circulation flow path 25 circulates the coolant whose temperature has increased in the hydrogen engine 15 to the coolant flow path 21 of the heater 20.

The vaporizer 40 includes a casing 41 and a hydrogen tube 45 housed inside the casing 41. A high-temperature heat medium heated by the heater 20 flows inside the casing 41. Low temperature liquid hydrogen or hydrogen gas flows inside the hydrogen tube 45. The heat medium flowing through the inside of the casing 41 flows on the outer surface of the hydrogen tube 45, heats and vaporizes the liquid hydrogen inside, and turns it into hydrogen gas.

The circulation flow path 30 includes a heat medium flow path 31 of the heater 20, a heat medium supply pipe 32, a casing 41 of the vaporizer 40, and a heat medium return pipe 33. The heat medium supply pipe 32 connects the outlet of the heat medium flow path 31 and the heat medium inlet 42 of the vaporizer 40. The heat medium return pipe 33 connects the heat medium outlet 43 of the vaporizer 40 and the inlet of the heat medium flow path 31. Further, the heat medium supply pipe 32 is provided with a circulation pump 34 that pumps the heat medium to the circulation flow path 30. Further, near the heat medium outlet 43 of the heat medium return pipe 33, a heat medium temperature sensor 38 is provided to detect the vaporizer outlet heat medium temperature TL.

The heat medium pressurized by the circulation pump 34 flows into the casing 41 from the heat medium inlet 42 through the heat medium supply pipe 32. The heat medium flows on the outer surface of the hydrogen tube 45 inside the casing 41 and exchanges heat with the low-temperature liquid hydrogen flowing inside the hydrogen tube 45, thereby reducing its temperature. The heat medium whose temperature has decreased flows out from the heat medium outlet 43 of the vaporizer 40 to the heat medium return pipe 33. The heat medium flows into the heat medium flow path 31 of the heater 20 from the heat medium return pipe 33. Then, the heat medium whose temperature has increased by exchanging heat with the high-temperature coolant flowing through the coolant flow path 21 in the heat medium flow path 31 returns to the circulation pump 34 from the heat medium supply pipe 32.

Next, the hydrogen circuit 50 will be explained. The hydrogen circuit 50 includes a liquid hydrogen tank 51, a liquid hydrogen pump inlet pipe 52, a liquid hydrogen pump 53, a liquid hydrogen inlet pipe 54, a hydrogen tube 45, a hydrogen gas outlet pipe 56, a pressure reducing valve 57, and a hydrogen gas supply pipe 59.

The liquid hydrogen tank 51 is a tank that stores low-temperature liquid hydrogen inside. The liquid hydrogen pump inlet pipe 52 connects the liquid hydrogen tank 51 and the suction port of the liquid hydrogen pump 53. The liquid hydrogen inlet pipe 54 connects the discharge port of the liquid hydrogen pump 53 and the inlet of the hydrogen tube 45. Hydrogen gas outlet pipe 56 connects the outlet of hydrogen tube 45 and pressure reducing valve 57. A hydrogen gas temperature sensor 58 is attached to the hydrogen gas outlet pipe 56 to detect the hydrogen gas temperature TH at the vaporizer outlet. The hydrogen gas supply pipe 59 connects the pressure reducing valve 57 and the injector 16 of the hydrogen engine 15.

The cryogenic liquid hydrogen stored in the liquid hydrogen tank 51 is pressurized by the liquid hydrogen pump 53 and flows into the hydrogen tube 45 from the liquid hydrogen pump inlet pipe 52. The liquid hydrogen flowing through the hydrogen tube 45 exchanges heat with the high-temperature heat medium flowing through the outer surface of the hydrogen tube 45, and is vaporized to become hydrogen gas. The hydrogen gas flowing through the hydrogen tube 45 exchanges heat with the high temperature heat medium flowing through the outer surface of the hydrogen tube 45, becomes hydrogen gas at a predetermined temperature, and is released from the outlet of the hydrogen tube 45. It flows out into outlet pipe 56. After the hydrogen gas is reduced in pressure to the supply pressure to the hydrogen engine 15 by the pressure reducing valve 57, it is supplied to the injector 16 of the hydrogen engine 15 through the hydrogen gas supply pipe 59. The hydrogen gas is combusted inside the hydrogen engine 15 to generate driving force, and also increases the temperature of the coolant flowing through the internal flow path 17.

Hydrogen engine 15 is controlled by engine control unit 60. The engine control unit 60 is a computer that includes a CPU 61, which is a processor that processes information, and a memory 62 in which control programs and control data are stored. The engine control unit 60 adjusts the opening degree of the injector 16 to adjust the output of the hydrogen engine 15. The engine control unit 60 is connected to a start switch 18 attached to the hydrogen engine vehicle 200. The engine control unit 60 starts the hydrogen engine 15 when the start switch 18 is turned on, and stops the hydrogen engine 15 when the start switch 18 is turned off. Further, the engine control unit 60 communicates with a control unit 70, which will be described later, to exchange information. Engine control unit 60 outputs the output of hydrogen engine 15 and the on/off signal of start switch 18 to control unit 70.

The control unit 70 is a computer that includes a CPU 71, which is a processor that performs information processing, and a memory 72 that stores control programs and control data. The circulation pump 34 and the liquid hydrogen pump 53 are connected to the control unit 70 and operate according to commands from the control unit 70. Further, the heat medium temperature sensor 38 is connected to the control unit 70, and the vaporizer outlet heat medium temperature TL detected by the heat medium temperature sensor 38 is inputted to the control unit 70. The control unit 70 also exchanges information with the engine control unit 60. The control unit 70 receives the output of the hydrogen engine 15 and the on/off signal of the start switch 18 from the engine control unit 60.

Figure 2:
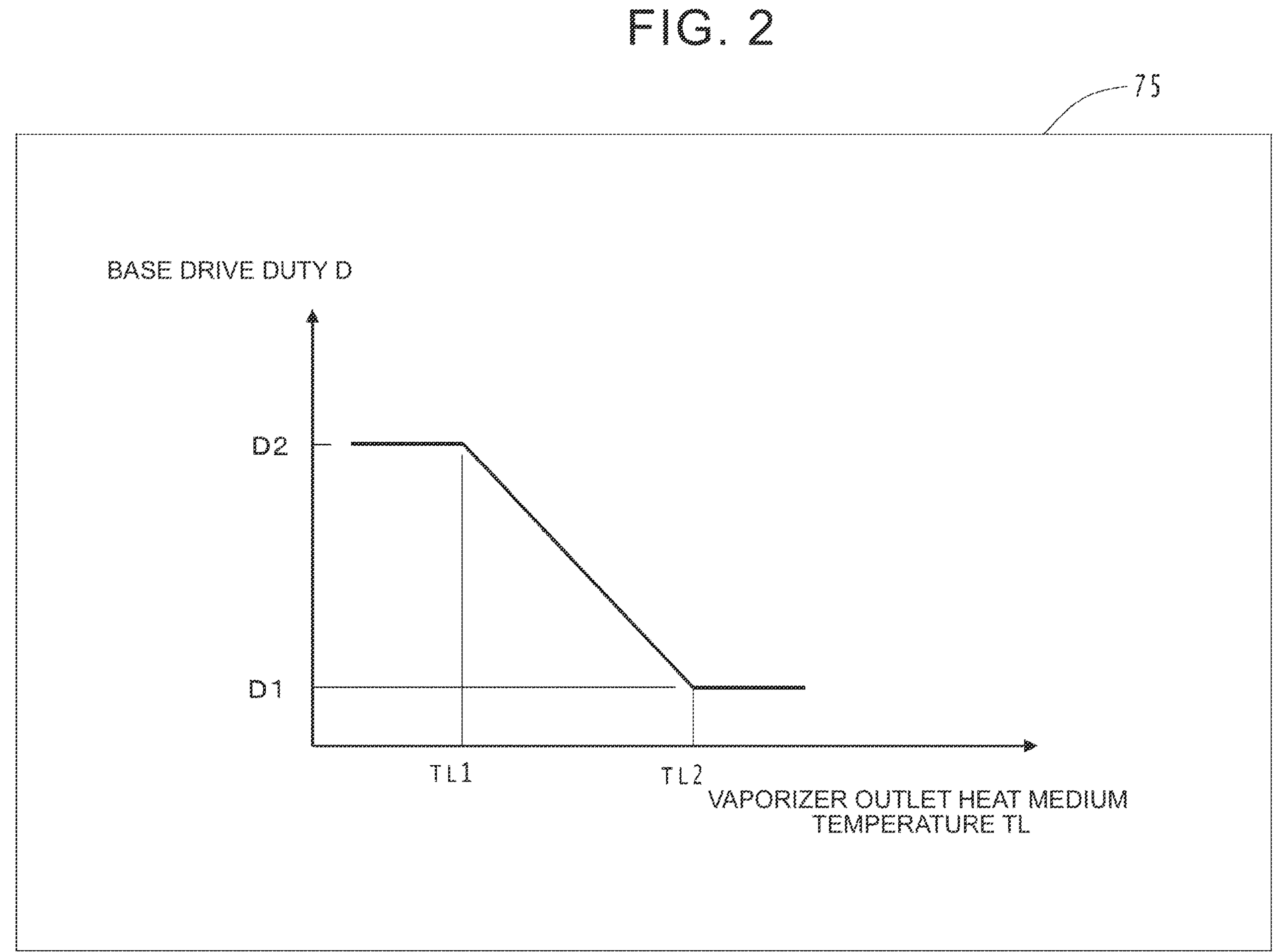
FIG. 2 is a base drive duty calculation map stored in the memory of the control unit shown in FIG. 1.
Figure 3:
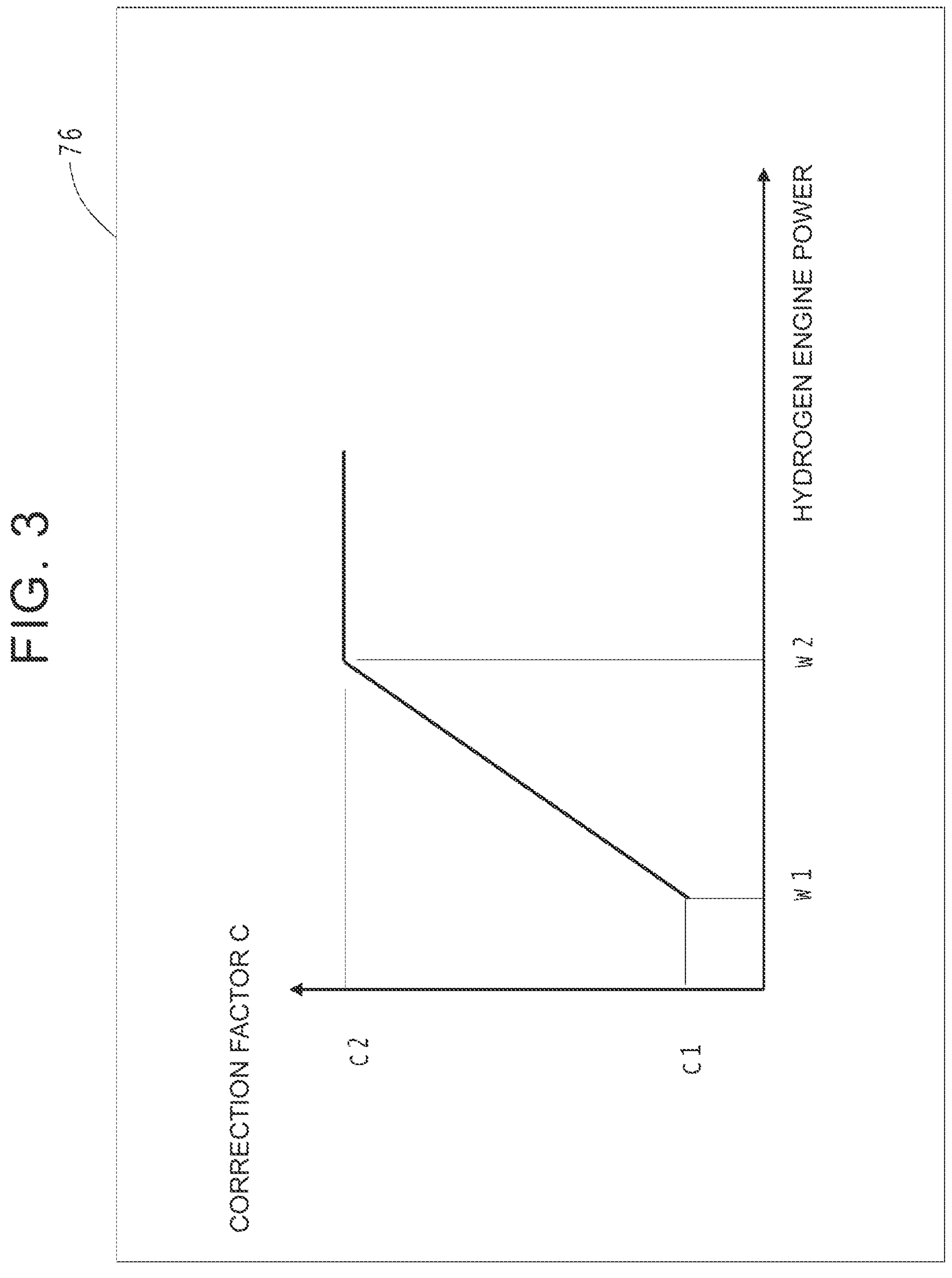
FIG. 3 is a correction coefficient calculation map stored in the memory of the control unit shown in FIG. 1.

The control unit 70 stores in the memory 62 a base drive duty calculation map 75 shown in FIG. 2 and a correction coefficient calculation map 76 shown in FIG. 3. The base drive duty calculation map 75 is a map that defines the base drive duty D with respect to the vaporizer outlet heat medium temperature TL. The base drive duty D is D2 until the vaporizer outlet heat medium temperature TL is TL1. When the vaporizer outlet heat medium temperature TL is between TL1 and TL2 (TL2>TL1), the base drive duty D decreases from D2 to D1 as the vaporizer outlet heat medium temperature TL increases. Then, the base drive duty D becomes constant D1 when the vaporizer outlet heat medium temperature TL exceeds TL2. Note that the base drive duty D is set between the minimum drive duty of the circulation pump 34 and 100%, so the maximum value of D2 is 100%, and the minimum value of D1 is the minimum drive duty of the circulation pump 34, for example, 10%.

Further, the correction coefficient calculation map 76 is a map that defines a correction coefficient C for correcting the base drive duty D of the circulation pump 34 with respect to the output of the hydrogen engine 15. The correction coefficient C is the minimum value C1 when the output of the hydrogen engine 15 is smaller than W1. The correction coefficient C increases from C1 to C2 when the output of the hydrogen engine 15 increases from W1 to W2. Then, when the output of the hydrogen engine 15 exceeds W2, the correction coefficient C becomes constant C2. In addition, in the hydrogen supply device 100 of this embodiment, the correction coefficient C is set to 1.0 or more, for example, between 1.0 and 2.0. In this case, the minimum value of C1 is 1.0 and the maximum value of C2 is 2.0.

The control unit 70 calculates the drive duty command value DS using the following formula 1 using the base drive duty D calculated using the base drive duty calculation map 75 and the correction coefficient C calculated using the correction coefficient calculation map 76. calculate.

$$\text{Drive duty command value } DS = \text{base drive duty } D \times \text{correction coefficient } C \quad \text{(Formula 1)}$$

The drive duty command value DS is a command value when controlling the flow rate of the circulation pump 34. When the vaporizer outlet heat medium temperature TL becomes low, the control unit 70 increases the base drive duty D to increase the flow rate of the heat medium flowing through the circulation flow path 30. As a result, the amount of heat exchanged between the heat medium and hydrogen in the vaporizer 40 increases, and the hydrogen gas temperature TH at the vaporizer outlet increases.

Further, when the vaporizer outlet heat medium temperature TL increases, the control unit 70 reduces the base drive duty D to reduce the flow rate of the heat medium flowing through the circulation flow path 30. As a result, the amount of heat exchanged between the heat medium and hydrogen in the vaporizer 40 decreases, and the hydrogen gas temperature TH at the vaporizer outlet decreases.

Further, as the output of the hydrogen engine 15 increases, the flow rate of hydrogen gas increases, and the hydrogen gas temperature TH at the outlet of the vaporizer decreases. On the other hand, when the output of the hydrogen engine 15 decreases, the hydrogen gas temperature TH at the outlet of the vaporizer increases. In this case, if the drive duty command value DS=base drive duty D, the hydrogen gas temperature TH at the outlet of the vaporizer may significantly decrease/increase due to an increase/decrease in the output of the hydrogen engine 15 due to a delay in control response. Therefore, in the hydrogen supply device 100 of the embodiment, advance control is performed to change the drive duty command value DS according to the output of the hydrogen engine 15 using the correction coefficient calculation map 76 and Equation 1. This suppresses large fluctuations in the hydrogen gas temperature TH at the outlet of the vaporizer. That is, when the output of the hydrogen engine 15 increases, the correction coefficient C is increased so that the drive duty command value DS increases by an amount that takes into account the decrease in the hydrogen gas temperature TH at the outlet of the vaporizer due to the increase in output. Further, when the output of the hydrogen engine 15 decreases, the correction coefficient C is decreased so that the drive duty command value DS is decreased by an amount that takes into account the increase in the hydrogen gas temperature TH at the outlet of the vaporizer due to the decrease in output. Thereby, even if there is a fluctuation in the output of the hydrogen engine 15, the hydrogen gas temperature TH at the outlet of the vaporizer can be maintained within a predetermined temperature range using a simple method.

Next, the operation of the hydrogen supply device 100 will be explained with reference to FIG. 4. When the start switch 18 is turned on, the hydrogen engine 15 and hydrogen supply device 100 are started. The control unit 70 of the hydrogen supply device 100 acquires the vaporizer outlet heat medium temperature TL using the heat medium temperature sensor 38 in S101 of FIG. 4. The control unit 70 proceeds to S102 in FIG. 4 and calculates the base drive duty D corresponding to the vaporizer outlet heat medium temperature TL with reference to the base drive duty calculation map 75 stored in the memory 72.

Figure 4:
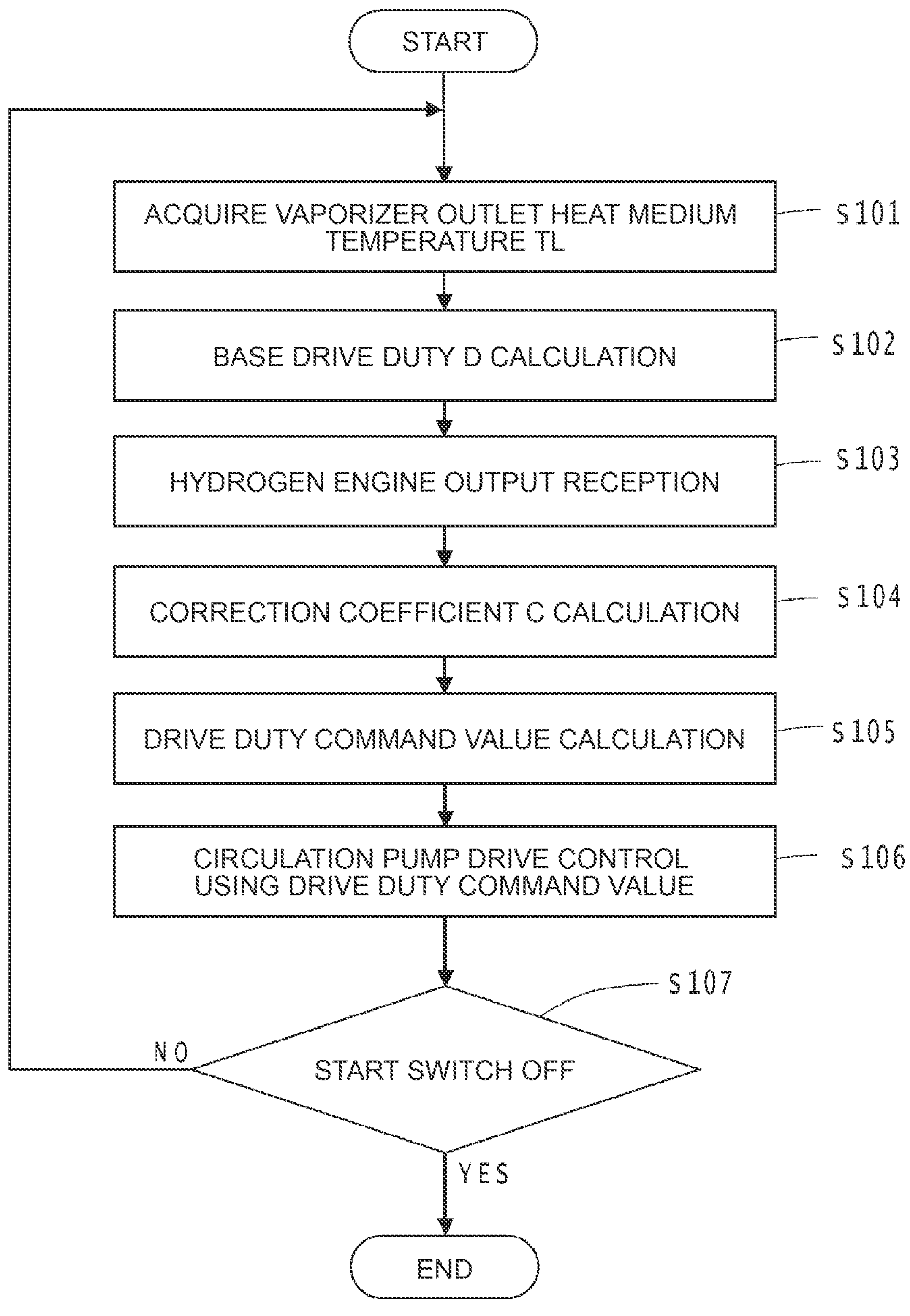
FIG. 4 is a flowchart showing the operation of the hydrogen supply device shown in FIG. 1.

In S103 of FIG. 4, the control unit 70 receives the output of the hydrogen engine 15 from the engine control unit 60. Then, in S104 of FIG. 4, the control unit 70 calculates a correction coefficient C corresponding to the output of the hydrogen engine 15 with reference to the correction coefficient calculation map 76 shown in FIG. 3.

Next, the control unit 70 proceeds to S105 in FIG. 4 and calculates the drive duty command value DS using Equation 1 described above.

Next, the control unit 70 proceeds to S106 in FIG. 4, and performs drive control of the circulation pump 34 using the calculated drive duty command value DS.

Next, after executing S106 in FIG. 4, the control unit 70 proceeds to S107 in FIG. 4. The control unit 70 determines whether an off signal for the start switch 18 has been received from the engine control unit 60 in S107. If the control unit 70 determines NO in S107 of FIG. 4, it returns to S101 of FIG. 4 and repeats the operations from S101 to S107. On the other hand, if the control unit 70 determines YES in S107 of FIG. 4, it ends the process.

In this way, the control unit 70 increases the base drive duty D to increase the flow rate of the heat medium flowing through the circulation flow path 30 when the vaporizer outlet heat medium temperature TL becomes low. Then, the amount of heat exchanged between the heat medium and hydrogen in the vaporizer 40 increases, and the hydrogen gas temperature TH at the vaporizer outlet increases. Further, when the vaporizer outlet heat medium temperature TL increases, the control unit 70 reduces the base drive duty D to reduce the flow rate of the heat medium flowing through the circulation flow path 30. Then, the amount of heat exchanged between the heat medium and hydrogen in the vaporizer 40 decreases, and the hydrogen gas temperature TH at the vaporizer outlet decreases. As a result, the hydrogen supply device 100 maintains the hydrogen gas temperature TH at the outlet of the vaporizer within a predetermined range, and prevents a decrease in the output of the hydrogen engine 15 due to an increase in the temperature of the hydrogen gas or a decrease in the temperature of the hydrogen gas. It is possible to suppress damage to hydrogen piping due to Further, the control unit 70 increases the correction coefficient C so that the drive duty command value DS increases by an amount that takes into account the decrease in the hydrogen gas temperature TH at the outlet of the vaporizer due to the increase in the output of the hydrogen engine 15, and increases the output of the hydrogen engine 15. The correction coefficient C is made smaller so that the drive duty command value DS becomes smaller by an amount that takes into account the rise in the hydrogen gas temperature TH at the outlet of the vaporizer due to the decrease. Thereby, even if there is a fluctuation in the output of the hydrogen engine 15, the hydrogen gas temperature TH at the outlet of the vaporizer can be maintained within a predetermined temperature range using a simple method.

In the above description, the hydrogen supply device 100 was described as supplying hydrogen gas to the hydrogen engine 15 of the hydrogen engine vehicle 200, but the hydrogen supply device 100 is not limited to this. For example, hydrogen gas may be supplied to a fuel cell, which is a power unit mounted on a vehicle.

What is claimed is:

1. A hydrogen supply device comprising:

a heater that heats a heating medium;

a vaporizer that vaporizes liquid hydrogen into a hydrogen gas using the heated heating medium;

a circulation flow path that circulates the heating medium between the heater and the vaporizer;

a circulation pump provided in the circulation flow path to pump the heating medium; and a control unit that adjusts operation of the circulation pump, wherein the control unit is configured to:

receive an output of a power device to which the hydrogen gas flowing out of the vaporizer is supplied and a temperature of the heating medium flowing out of the vaporizer;

calculate a drive duty command value for the circulation pump based on the temperature of the heating medium flowing out of the vaporizer and the output of the power device; and drive the circulation pump based on the calculated drive duty command value.

2. The hydrogen supply device according to claim 1, wherein the control unit is further configured to:

calculate a base drive duty for the circulation pump based on the temperature of the heating medium flowing out of the vaporizer;

calculate a correction coefficient based on the output of the power device; and calculate the drive duty command value by multiplying the base drive duty by the correction coefficient.

3. The hydrogen supply device according to claim 2, wherein the control unit is further configured to:

calculate the base drive duty such that the base drive duty becomes smaller as the temperature of the heating medium flowing out of the vaporizer becomes higher; and calculate the correction coefficient such that the correction coefficient becomes larger as the output of the power device becomes larger.

* * * * *